US012700615B2

(12) United States Patent
Onodera et al.

(10) Patent No.: US 12,700,615 B2
(45) Date of Patent: Aug. 4, 2026

(54) SOLID ELECTROLYTE AND SECONDARY BATTERY INCLUDING THE SAME

(71) Applicant: DENSO CORPORATION, Kariya-city (JP)

(72) Inventors: Hitoshi Onodera, Kariya-city (JP); Shuhei Yoshida, Kariya-city (JP); Yuta Shimonishi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 526 days.

(21) Appl. No.: 18/461,545

(22) Filed: Sep. 6, 2023

(65) Prior Publication Data

US 2024/0250293 A1      Jul. 25, 2024

(30) Foreign Application Priority Data

Jan. 19, 2023      (JP) .................................. 2023-006763

(51) Int. Cl.
| | |
|---|---|
| *H01M 10/0562* | (2010.01) |
| *H01M 4/02* | (2006.01) |
| *H01M 4/62* | (2006.01) |
| *H01M 10/0585* | (2010.01) |
| *H01M 50/431* | (2021.01) |
| *H01M 50/443* | (2021.01) |
| *H01M 50/449* | (2021.01) |

(52) U.S. Cl.
CPC ......... *H01M 10/0562* (2013.01); *H01M 4/62* (2013.01); *H01M 10/0585* (2013.01); *H01M 50/431* (2021.01); *H01M 50/443* (2021.01); *H01M 50/449* (2021.01); *H01M 2004/028* (2013.01); *H01M 2300/0071* (2013.01); *H01M 2300/008* (2013.01); *H01M 2300/0094* (2013.01)

(58) Field of Classification Search
CPC .................................................. H01M 10/0562
See application file for complete search history.

(56) References Cited

U.S. PATENT DOCUMENTS

| | | | |
|---|---|---|---|
| 2017/0346092 A1 | 11/2017 | Yada et al. | |
| 2021/0135282 A1* | 5/2021 | Furusawa ........... | H01M 10/052 |

FOREIGN PATENT DOCUMENTS

| | | |
|---|---|---|
| JP | 6620770 B2 | 12/2019 |
| JP | 2020-080231 A | 5/2020 |
| JP | 2021-150140 A | 9/2021 |

* cited by examiner

*Primary Examiner* — Brian R Ohara
(74) *Attorney, Agent, or Firm* — Harness, Dickey & Pierce, P.L.C.

(57) ABSTRACT

A solid electrolyte for a secondary battery includes a core phase having a particle shape and a shell phase covering at least a part of the core phase. The shell phase consists of one or more phases. A constituent material of the core phase includes a pyrochlore solid electrolyte represented by a composition formula of $Aa_{2-\alpha}Ab_{(1+\alpha)/3}B_2O_{7-\beta}X_\beta$, where Aa is an alkali metal, Ab is a lanthanoid, B is a cationic metal, and X is an anion that is substitutable with O. A constituent material of the shell phase includes a material having a chemical composition including Li and different from a chemical composition of the pyrochlore solid electrolyte, and having a melting point lower than a melting point of the pyrochlore solid electrolyte.

7 Claims, 9 Drawing Sheets

10

11 12 15 14 13

100

101

102

FIG. 6
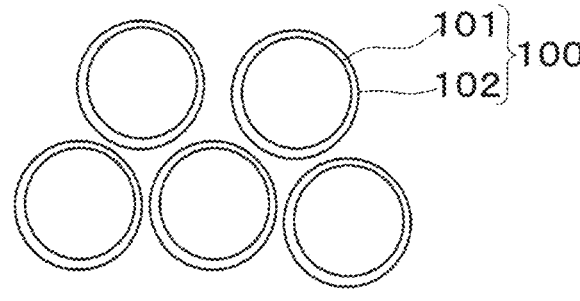
SOLID ELECTROLYTE PARTICLES
PRESSURE FORMING
100MPa
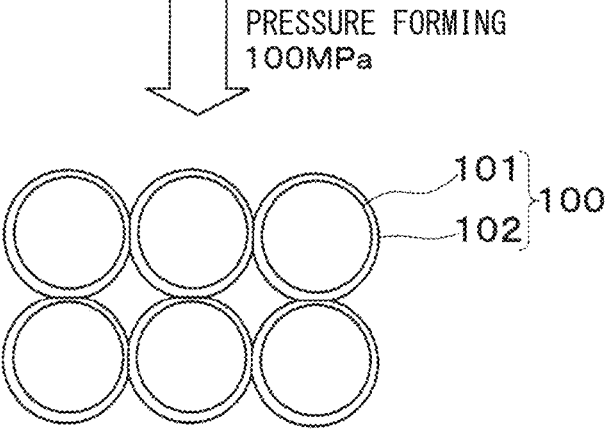
GREEN COMPACT OF SOLID ELECTROLYTE
SINTERING
1000°C, 6h
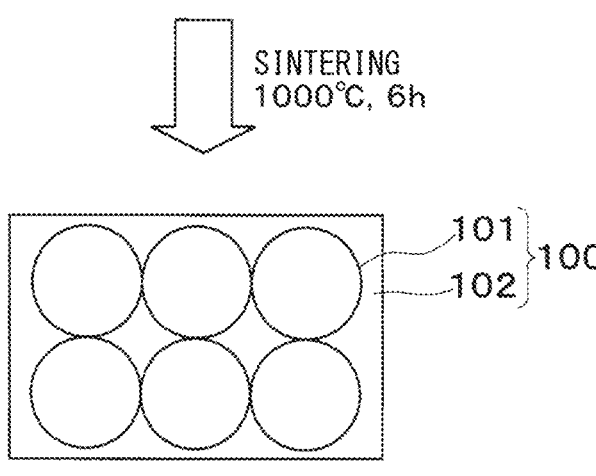
SINTERED COMPACT OF SOLID ELECTROLYTE

FIG. 7

| | CORE PHASE | SHELL PHASE | | | THICKNESS OF SHELL PHASE (μm) | RELATIVE DENSITY (%) | ION CONDUCTIVITY (S/cm) |
| | | FIRST PHASE | SECOND PHASE | THIRD PHASE | | | |
|---|---|---|---|---|---|---|---|
| EXAMPLE 1 | $Li_{1.25}La_{0.58}Nb_2O_6F$ | LiF | — | — | 0.1 | 88 | $5.0 \times 10^{-3}$ |
| EXAMPLE 2 | $Li_{1.25}La_{0.58}Nb_2O_6F$ | LiF | — | — | 0.4 | 92 | $8.0 \times 10^{-3}$ |
| EXAMPLE 3 | $Li_{1.25}La_{0.58}Nb_2O_6F$ | LiF | — | — | 2.0 | 93 | $6.0 \times 10^{-3}$ |
| EXAMPLE 4 | $Li_{1.25}La_{0.58}Nb_2O_6F$ | LiF | $LiNbO_3$ | — | 0.4 | 85 | $4.2 \times 10^{-3}$ |
| EXAMPLE 5 | $Li_{1.25}La_{0.58}Nb_2O_6F$ | LiF | $LiNb_6O_{15}F$ | — | 1.0 | 87 | $6.3 \times 10^{-3}$ |
| EXAMPLE 6 | $Li_{1.25}La_{0.58}Nb_2O_6F$ | LiF | $LiNb_6O_{15}F$ | $LiNbO_3$ | 2.0 | 87 | $8.0 \times 10^{-3}$ |
| EXAMPLE 7 | $Li_{1.25}La_{0.5}Ta_2O_6F$ | LiF | — | — | 0.1 | 85 | $1.3 \times 10^{-3}$ |
| COMPARATIVE EXAMPLE 1 | $Li_{1.25}La_{0.58}Nb_2O_6F$ | — | — | — | — | 68 | $2.3 \times 10^{-4}$ |
| COMPARATIVE EXAMPLE 2 | $Li_{1.25}La_{0.5}Ta_2O_6F$ | — | — | — | — | 65 | $5.0 \times 10^{-5}$ |

FIG. 8
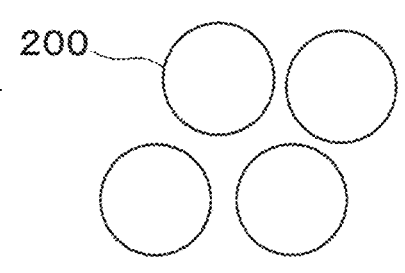
POSITIVE ELECTRODE
ACTIVE MATERIAL PARTICLES
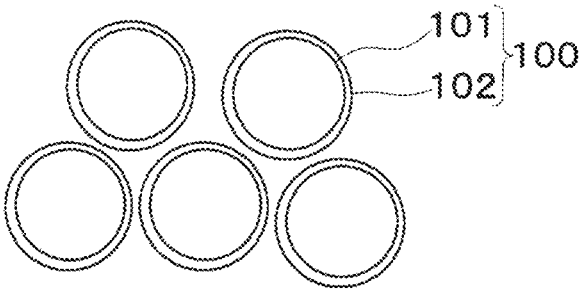
SOLID ELECTROLYTE PARTICLES
PRESSURE FORMING
100MPa
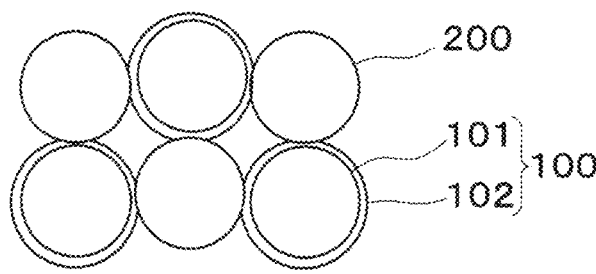
GREEN COMPACT OF POSITIVE ELECTRODE
ACTIVE MATERIAL AND SOLID ELECTROLYTE
SINTERING
850℃, 6h
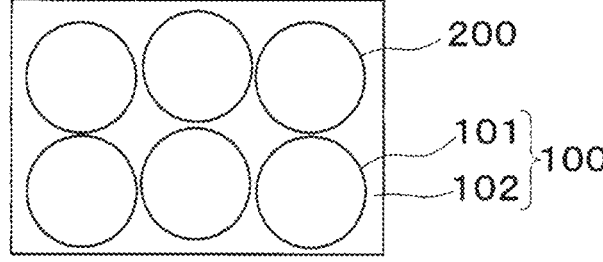
SINTERED COMPACT OF POSITIVE ELECTRODE
ACTIVE MATERIAL AND SOLID ELECTROLYTE

FIG. 9

| | CORE PHASE | SHELL PHASE | | POSITIVE ELECTRODE ACTIVE MATERIAL | BYPRODUCT | ION CONDUCTIVITY (S/cm) |
|---|---|---|---|---|---|---|
| | | FIRST PHASE | SECOND PHASE | | | |
| EXAMPLE 8 | $Li_{1.25}La_{0.58}Nb_2O_6F$ | LiF | $LiNbO_3$ | $LiCoO_2$ | — | $2.0 \times 10^{-4}$ |
| EXAMPLE 9 | $Li_{1.25}La_{0.58}Nb_2O_6F$ | LiF | $LiNbO_3$ | $LiNi_{0.33}Mn_{0.33}Co_{0.33}O_2$ | — | $3.0 \times 10^{-5}$ |
| COMPARATIVE EXAMPLE 3 | $Li_{1.25}La_{0.58}Nb_2O_6F$ | — | — | $LiCoO_2$ | $Li_{0.5}La_{0.5}CoO_2$ $Li_{0.5}La_{0.5}Nb_2O_6$ | $7.0 \times 10^{-9}$ |
| COMPARATIVE EXAMPLE 4 | $Li_7La_3Zr_2O_{12}$ | — | — | $LiCoO_2$ | $Li_{0.5}La_{0.5}CoO_2$ $La_2Zr_2O_7$ | $8.0 \times 10^{-9}$ |

1

SOLID ELECTROLYTE AND SECONDARY BATTERY INCLUDING THE SAME

CROSS REFERENCE TO RELATED APPLICATION

The present application claims the benefit of priority from Japanese Patent Application No. 2023-006763 filed on Jan. 19, 2023. The entire disclosure of the above application is incorporated herein by reference.

TECHNICAL FIELD

The present disclosure relates to a solid electrolyte for a secondary battery and a secondary battery including the same.

BACKGROUND

In recent years, as secondary batteries without using organic solvents as electrolytes, secondary batteries using solid electrolytes have attracted attention from a viewpoint of improving safety. As such solid electrolytes for secondary batteries, a sulfide solid electrolyte, an oxide solid electrolyte, and the like have been proposed.

SUMMARY

The present disclosure provides a solid electrolyte that includes a core phase having a particle shape and a shell phase covering at least a part of the core phase. The shell phase consists of one or more phases. A constituent material of the core phase includes a pyrochlore solid electrolyte represented by a composition formula of $Aa_{2-\alpha}Ab_{(1+\alpha)/3}B_2O_{7-\beta}X_\beta$, where Aa is an alkali metal, Ab is a lanthanoid, B is a cationic metal, and X is an anion that is substitutable with O. A constituent material of the shell phase includes a material having a chemical composition including Li and different from a chemical composition of the pyrochlore solid electrolyte, and having a melting point lower than a melting point of the pyrochlore solid electrolyte.

BRIEF DESCRIPTION OF DRAWINGS

Objects, features and advantages of the present disclosure will become apparent from the following detailed description made with reference to the accompanying drawings. In the drawings:

FIG. 6 is a diagram illustrating a green compact and a sintered compact of the composite solid electrolyte;

FIG. 7 is a diagram showing relative densities and ion conductivities of Examples of the first embodiment and Comparative Examples;

FIG. 8 is a diagram illustrating a green compact and a sintered compact of a positive electrode active material and a composite solid electrolyte according to a second embodiment;

2

Figure 10:
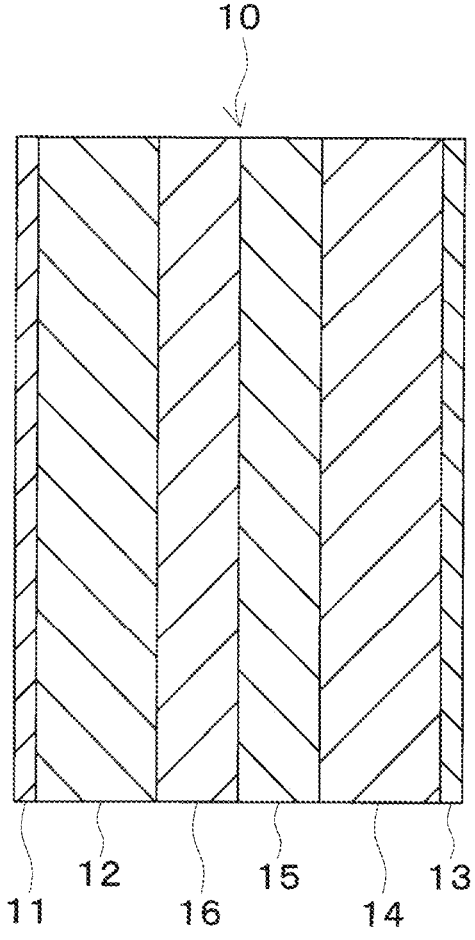

FIG. 9 is a diagram showing byproducts and ion conductivities of Examples of the second embodiment and Comparative Examples; and FIG. 10 is a cross-sectional view illustrating a configuration of a secondary battery according to a third embodiment.

DETAILED DESCRIPTION

Examples of solid electrolytes for secondary batteries include a sulfide solid electrolyte and an oxide solid electrolyte. Examples of solid electrolytes that are more stable in air include an oxide solid electrolyte having a garnet structure (for example, lithium lanthanum zirconium oxide (LLZO)) and an oxide solid electrolyte having a sodium super ionic conductor (NASICON) structure (for example, lithium aluminum germanium phosphate (LAGP)).

However, conventionally-used oxide-based solid electrolytes have low ion conductivities, and it is difficult to sufficiently increase an output density of a secondary battery. Therefore, the present applicant has proposed an oxide-based solid electrolyte having a pyrochlore structure as a solid electrolyte for a secondary battery. A pyrochlore solid electrolyte can improve an ion conductivity more than the conventionally-used oxide-based solid electrolyte, but further improvement of the ion conductivity is desired in order to further improve a performance of a secondary battery.

A solid electrolyte for a secondary battery according to an aspect of the present disclosure includes a core phase having a particle shape and a shell phase covering at least a part of the core phase. The shell phase consists of one or more phases. A constituent material of the core phase includes a pyrochlore solid electrolyte represented by a composition formula of $Aa_{2-\alpha}Ab_{(1+\alpha)/3}B_2O_{7-\beta}X_\beta$, where Aa is an alkali metal, Ab is a lanthanoid, B is a cationic metal, and X is an anion that is substitutable with O. A constituent material of the shell phase includes a material having a chemical composition including Li and different from a chemical composition of the pyrochlore solid electrolyte, and having a melting point lower than a melting point of the pyrochlore solid electrolyte. In the composition formula, α is in a range of $0.6<\alpha<2.0$, β is in a range of $0<\beta\leq1$, and a sum of valences of cations composed of Aa, Ab and B and anions composed of O and X is negative. The pyrochlore solid electrolyte has a defective structure.

According to the above configuration, a relative density and a contact area of the solid electrolyte for the secondary battery can be improved, and as a result, an ion conductivity of the solid electrolyte for the secondary battery can be improved.

The following will describe embodiments for carrying out the present disclosure with reference to the drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration.

The present disclosure is not limited to combinations of embodiments which combine parts that are explicitly described as being combinable. As long as no problem is present, the various embodiments may be partially combined with each other even if not explicitly described.

First Embodiment

Hereinafter, embodiments in which a solid electrolyte for a secondary battery of the present disclosure is applied to a lithium ion battery will be described with reference to the drawings. A secondary battery 10 of the present embodiment is a lithium ion battery in which charging and discharging are performed by lithium ions moving between a negative electrode 12 and a positive electrode 14.

Figure 1:
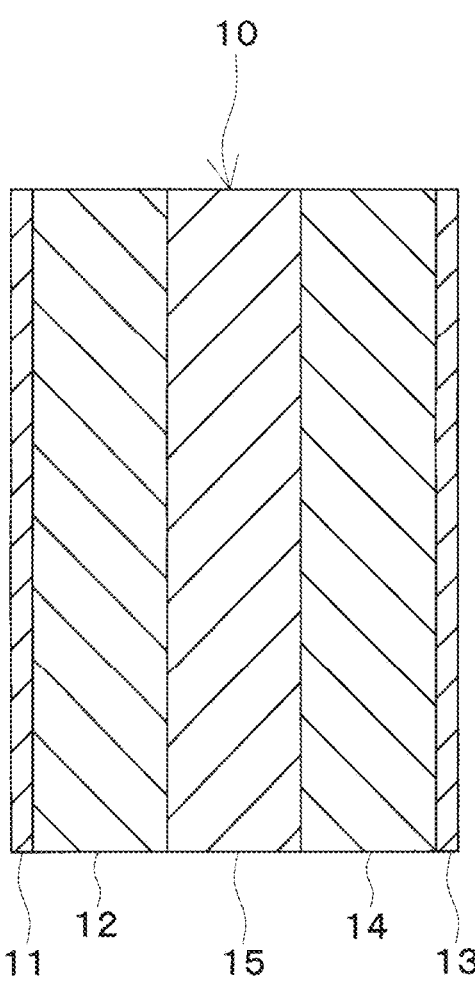
FIG. 1 is a cross-sectional view illustrating a configuration of a secondary battery according to a first embodiment.

As shown in FIG. 1, the secondary battery 10 includes a negative electrode current collector 11, the negative electrode 12, a positive electrode current collector 13, the positive electrode 14, and an electrolyte layer 15. These layers of the negative electrode current collector 11, the negative electrode 12, the positive electrode current collector 13, the positive electrode 14, and the electrolyte layer 15 are stacked.

The negative electrode 12 and the positive electrode 14 sandwich the electrolyte layer 15 therebetween. The negative electrode 12 and the positive electrode 14 are in contact with the electrolyte layer 15, and the negative electrode 12 and the positive electrode 14 are connected through the electrolyte layer 15. The secondary battery 10 of the present embodiment is a lithium ion battery cell in which charging and discharging are performed by lithium ions moving between the negative electrode 12 and the positive electrode 14 through the electrolyte layer 15.

A stacked body including the negative electrode 12, the positive electrode 14, and the electrolyte layer 15 is disposed between the negative electrode current collector 11 and the positive electrode current collector 13. The negative electrode current collector 11 is in contact with the negative electrode 12. The positive electrode current collector 13 is in contact with the positive electrode 14. The negative electrode current collector 11 and the positive electrode current collector 13 are connected to each other through the stacked body.

Any material that can be used as a current collector for a lithium ion battery can be used for the negative electrode current collector 11 and the positive electrode current collector 13. In the present embodiment, Cu is used as the negative electrode current collector 11, and Al is used as the positive electrode current collector 13.

The negative electrode 12 includes a negative electrode active material. As the negative electrode active material, any material that can be used as a negative electrode active material for a lithium ion battery can be used, and for example, lithium metal, graphite, Si, or a mixture thereof can be used. The negative electrode 12 may contain a binder.

The positive electrode 14 includes a positive electrode active material. As the positive electrode active material, any material that can be used as a positive electrode active material for a lithium ion battery can be used. The positive electrode 14 may contain a binder. As the binder contained in the positive electrode 14, for example, an organic binder can be used. As an organic solvent-based binder, for example, polyvinylidene fluoride (PVdF), an acrylic binder, a urethane binder, or the like can be used.

As the positive electrode active material, for example, a layered active material, a spinel active material, or an olivine active material can be used. As the layered active material, for example, a ternary positive electrode material such as $LiCoO_2$ (LCO), $LiNiO_2$ (LNO), $LiNi_{0.8}Co_{0.15}Al_{0.05}O_2$ (NCA), $LiNi_{0.8}Co_{0.1}Mn_{0.1}O_2$ (NCM811), or $LiNi_{0.33}Mn_2Co_2O_2$ can be used. As the spinel type active material, for example, $LiMn_2O_4$ or $LiNi_{0.5}Mn_{1.5}O_4$ can be used. As the olivine active material, for example, $LiMn_{0.8}Fe_{0.2}PO_4$ (LMFP) or $LiFePO_4$ (LFP) can be used.

The electrolyte layer 15 is disposed so as to be in direct contact with the negative electrode 12 and the positive electrode 14. The electrolyte layer 15 includes an electrolyte material having lithium ion conductivity. The electrolyte material of the electrolyte layer 15 has ion conductivity and can move lithium ions between the negative electrode 12 and the positive electrode 14.

Figure 2:
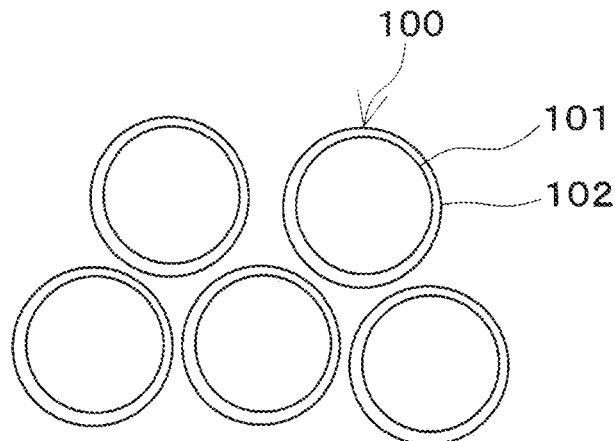
FIG. 2 is a diagram illustrating a cross-sectional configuration of a composite solid electrolyte.

In the present embodiment, a composite solid electrolyte 100 shown in FIG. 2 is included as the electrolyte material of the electrolyte layer 15. The electrolyte layer 15 may contain a polymer (for example, polyethylene oxide) in addition to the composite solid electrolyte 100. The composite solid electrolyte 100 corresponds to a solid electrolyte for a secondary battery of the present disclosure.

The composite solid electrolyte 100 has a particle shape and has a core phase 101 and a shell phase 102. The core phase 101 has a particle shape, and the shell phase 102 covers at least a part of the core phase 101. The shell phase 102 may cover the entire surface of the core phase 101 or may cover a part of the core phase 101.

A constituent material of the core phase 101 and a constituent material of the shell phase 102 are ion conductive substances having different chemical compositions. The shell phase 102 includes one or more phases. When the shell phase 102 includes a plurality of phases, chemical compositions of respective phases are different, and the phases are formed in layers. FIG. 2 shows an example in which the shell phase 102 consists of one phase. An ion conductivity of the constituent material of the core phase 101 is higher than an ion conductivity of the constituent material of the shell phase 102.

The shell phase 102 has a function as an element diffusion barrier layer. For example, when heating is performed in a state where the composite solid electrolyte 100 and the positive electrode active material are in contact with each other, diffusion of elements contained in the core phase 101 into the positive electrode active material is restricted and diffusion of elements contained in the positive electrode active material into the core phase 101 is restricted.

The constituent material of the core phase 101 is an oxide-based solid electrolyte, and is a pyrochlore solid electrolyte having a pyrochlore structure. The constituent material of the shell phase 102 has a chemical composition containing any of constituent elements of the pyrochlore solid electrolyte that is the constituent material of the core phase 101.

In the present embodiment, the pyrochlore solid electrolyte of the core phase 101 contains at least one of Li and F (that is, Li or F or both Li and F), and the constituent material of the shell phase 102 has a chemical composition containing the at least one of Li and F. Examples of the constituent material of the core phase 101 include $Li_{1.25}La_{0.58}Nb_2O_6F$ and $Li_{1.25}La_{0.58}Ta_2O_6F$. Examples of the constituent material of the shell phase 102 include LiF, $LiNb_6O_{15}F$, and $LiNbO_3$.

The constituent material of the shell phase 102 is a material having a melting point lower than a melting point of the constituent material of the core phase 101. The constituent material of the shell phase 102 is a material having a Young's modulus lower than a Young's modulus of the constituent material of the core phase 101. For example, the Young's modulus of the core phase 101 made of $Li_{1.25}La_{0.58}Nb_2O_6F$ is about 100 GPa, and the Young's modulus of the shell phase 102 made of LiF is about 50 to 70 GPa.

Here, the pyrochlore solid electrolyte of the core phase 101 will be described. The pyrochlore solid electrolyte of the core phase 101 has a pyrochlore structure represented by the composition formula of "$Aa_{2-\alpha}Ab_{(1+\alpha)/3}B_2O_{7-\beta}X_\beta$".

In the above composition formula, O is an oxygen atom, and Aa, Ab, B, and X represent any element or group. Aa, Ab and B are different types of cations, and O and X are different types of anions.

In the above composition formula, $0.6 < \alpha < 2.0$, and $0 < \beta \leq 1$. When $\alpha$ changes, the composition ratio of Aa and Ab changes, and when $\beta$ changes, the composition ratio of O and X changes.

Aa is an alkali metal. As the alkali metal represented by Aa, any one of Li, Na, and K can be used. In the present embodiment, Li is used as Aa. The composition ratio $(2-\alpha)$ of Aa is in the range of $0 < (2-\alpha) < 1.4$.

Ab contains at least a lanthanoid. As the lanthanoid represented by Ab, at least one of La, Ce, Nd, and Sm can be used. In the present embodiment, La is used as Ab. The composition ratio $(1+\alpha)/3$ of Ab is in the range of $0.53 < (1+\alpha)/3 < 1$.

A basic structure of Ab consists of the lanthanoid, and a part of the lanthanoid constituting Ab may be substituted with an alkaline earth metal (Ca, Mg, Sr, or the like). In the electrolyte material of the present embodiment, it is considered that since the lanthanoid is contained in the pyrochlore structure in which $0.6 < \alpha < 2.0$ and $0 < \beta \leq 1$ in the above composition formula, defects are generated in the crystal structure and the ion conductivity is improved.

In the pyrochlore solid electrolyte of the present embodiment, an A cation in a composition formula "$A_2B_2O_7$" of a general pyrochlore structure is a composite cation including lithium and the lanthanoid. This fact is considered to contribute to the improvement of the ion conductivity of the pyrochlore solid electrolyte of the present embodiment.

B is a cationic metal different from Aa and Ab, and is a transition metal or a metal selected from Group 15 elements. B constitutes an octahedron surrounded by six O atoms in a crystal. As the transition metal represented by B, a Group 4 transition metal or a Group 5 transition metal can be used, and more specifically, at least one of Nb, Ta, Ti, Zr, Hf, and V can be used. As the group 15 element represented by B, Sb and Bi can be used.

X is an anion that can be substituted with an O atom constituting the pyrochlore structure. X is different from an O atom in electronegativity and polarizability. As the anion represented by X, at least one of F, S, Cl, and OH can be used. The composition ratio $\beta$ of X is in the range of $0 < \beta \leq 1$, and at least a part of O atoms constituting the pyrochlore structure is substituted with X. In the present embodiment, F is used as X.

The pyrochlore solid electrolyte of the present embodiment has a defect structure in which lattice defects are included in the crystal by replacing a part of O atoms constituting the pyrochlore structure with anions having electronegativity and polarizability different from those of the O atoms. The pyrochlore solid electrolyte of the present embodiment is considered to have improved ion conductivity because the pyrochlore structure includes the defective structure.

In the pyrochlore solid electrolyte of the present embodiment, Aa and Ab are partially deficient as a defect structure. The composition formula of the general pyrochlore structure is "$A_2B_2O_7$", and a composition ratio of the A cation is 2. In contrast, in the pyrochlore solid electrolyte of the present embodiment, composition ratios of Aa and Ab are "$2-\alpha$" and "$(1+\alpha)/3$", respectively, and $0.6 < \alpha < 2.0$, so that the total composition ratio of Aa and Ab is less than 2. That is, in the pyrochlore solid electrolyte of the present embodiment, at least one of Aa and Ab is partially deficient. A composition ratio corresponding to the deficient portion of Aa and Ab is $(2\alpha-1)/3$.

In addition to the deviation of the composition ratio, the defect structure can also be formed by making a sum of valences of the cations including Aa, Ab and B and the anions including O and X negative in the above composition formula.

In addition, the pyrochlore solid electrolyte of the present embodiment is a composite anion compound in which a plurality of anions such as O and X are contained in the pyrochlore structure, and there is the anion represented by X in a BO6-coordinated octahedral structure. Therefore, the alkali metal of Aa can be positioned at the center of a space with a BO6-coordinated octahedron without being shifted to the BO6-coordinated octahedron. Therefore, it is considered that the pyrochlore solid electrolyte of the present embodiment has high ion conduction when used by applying an electric field such as a battery.

In addition, since $\alpha$ and $\beta$ in the above composition formula affect lattice defects and ion conductivity, it is desirable to set $\alpha$ and $\beta$ in an appropriate range. When the values of $\alpha$ and $\beta$ are large, a defect concentration in the crystal lattice increases, but when the values exceed a certain amount, the concentration of the alkali metal represented by Aa decreases and the ion conductivity decreases. Therefore, it is desirable to control $\alpha$ within a range of $0.6 < \alpha < 2.0$ and $\beta$ within a range of $0 < \beta \leq 1$.

Next, a method of producing the composite solid electrolyte 100 of the present embodiment will be described. In the present embodiment, when the pyrochlore solid electrolyte of the core phase 101 is produced, the shell phase 102 is also formed at the same time. That is, the composite solid electrolyte 100 including the core phase 101 and the shell phase 102 is formed by producing the pyrochlore solid electrolyte.

A part of the raw material for producing the pyrochlore solid electrolyte is in excess of a necessary amount so that the shell phase 102 is formed from the excess raw material. For example, in a process of producing the pyrochlore solid electrolyte, LiF, which is a raw material for producing the pyrochlore solid electrolyte, is added in excess of the necessary amount so that the shell phase 102 made of LiF can be formed on a surface of the core phase 101 made of the pyrochlore solid electrolyte.

Figure 3:
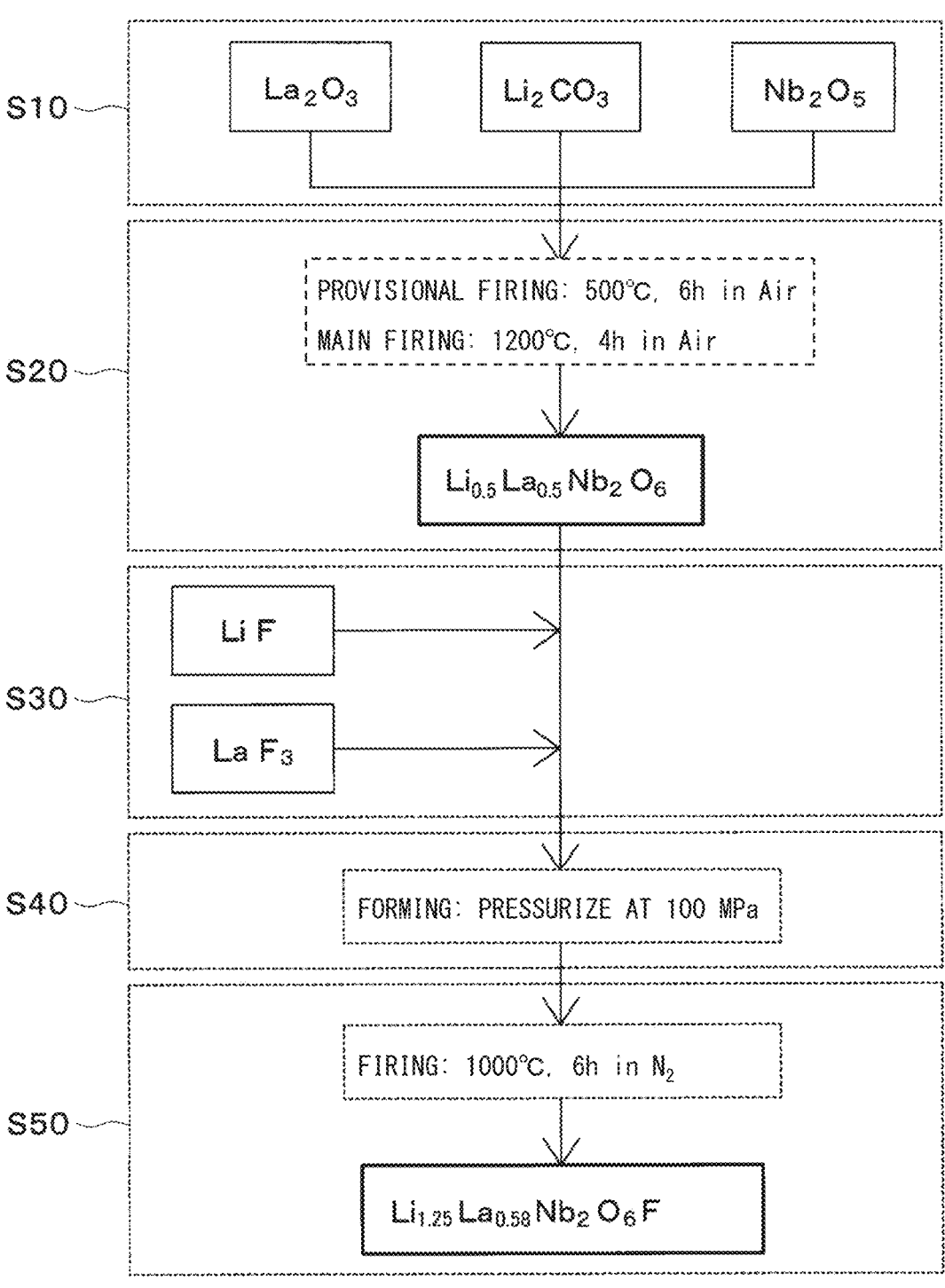
FIG. 3 is a diagram illustrating a process of producing a pyrochlore solid electrolyte.

FIG. 3 shows a method of producing the pyrochlore solid electrolyte of the present embodiment. In the method of producing the pyrochlore solid electrolyte, a first mixing process S10, a first firing process S20, a second mixing process S30, a forming process S40, and a second firing process S50 are sequentially performed.

<First Mixing Process>

First, a lanthanum source, a lithium source, and a niobium source are prepared as raw materials of the pyrochlore solid electrolyte, and the first mixing process S10 of mixing the raw materials is performed. As the lanthanum source, the lithium source, and the niobium source, a metal oxide, a metal carbonate, or the like can be used. In the present embodiment, $La_2O_3$ is used as the lanthanum source, $Li_2CO_3$ is used as the lithium source, and $Nb_2O_5$ is used as the niobium source. In the first mixing process, $La_2O_3$, $Li_2CO_3$, and $Nb_2O_5$ are mixed at a predetermined ratio.

<First Firing Process>

Next, the first firing process S20 of firing the mixture of $La_2O_3$, $Li_2CO_3$, and $Nb_2O_5$ is performed. In the first firing process S20, two stages of firing are performed.

In a first stage, a provisional firing is performed by heating the mixture in air at 500° C. for 6 hours. By the provisional firing, moisture and the like are removed from the mixture, and a reactivity can be increased. Subsequent to the provisional sintering, a main firing in which the mixture is heated in air at 1200° C. for 4 hours is performed. Accordingly, $Li_{0.5}La_{0.5}Nb_2O_6$ which is a precursor of a target product is obtained.

<Second Mixing Process>

Next, in the second mixing process S30, a fluorine source is prepared as a raw material, and the fluorine source is mixed with $Li_{0.5}La_{0.5}Nb_2O_6$ being the precursor. As the fluorine source, a metal fluoride can be used. In the present embodiment, LiF and $LaF_3$ are used as fluorine sources. LiF is a fluorine source and a lithium source, and $LaF_3$ is a fluorine source and a lanthanum source. In the second mixing process S30, LiF and $LaF_3$ are mixed with $Li_{0.5}La_{0.5}Nb_2O_6$ at a predetermined ratio to obtain a mixed powder.

In the present embodiment, in order to form the shell phase 102 made of LiF, LiF is added in excess of the necessary amount for producing the pyrochlore solid electrolyte.

<Forming Process>

Next, the forming process S40 is performed in which the mixed powder of $Li_{0.5}La_{0.5}Nb_2O_6$, LiF, and $LaF_3$ is processed into a pellet shape and is pressurized at 100 MPa. Accordingly, the mixture of $Li_{0.5}La_{0.5}Nb_2O_6$, LiF, and $LaF_3$ is formed into a pellet shape.

<Second Firing Process>

Next, the second firing process S50 of firing the mixture of $Li_{0.5}La_{0.5}Nb_2O_6$, LiF, and $LaF_3$ is performed. In the second firing process S50, firing is performed by heating the mixture of $Li_{0.5}La_{0.5}Nb_2O_6$, LiF, and $LaF_3$ at 1000° C. for 6 hours in a nitrogen atmosphere.

Through the above processes, the composite solid electrolyte 100 having the core phase 101 composed of the pyrochlore solid electrolyte represented by the composition formula "$Li_{1.25}La_{0.58}Nb_2O_6F$" and the shell phase 102 composed of LiF can be obtained. The composite solid electrolyte 100 obtained in the second firing process S50 is in the form of particles and can be used as the electrolyte material for the electrolyte layer 15.

Note that a pyrochlore solid electrolyte represented by the composition formula "$Li_{2-\alpha}La_{(1+\alpha)/3}Nb2O_{7-\beta}F_\beta$" can be obtained by changing the mixing ratio of $La_2O_3$, $Li_2CO_3$, and $Nb_2O_5$ and the mixing ratio of LiF and $LaF_3$ in the above production process.

In the composition formula, $\alpha$ can be adjusted by changing the mixing ratio of $La_2O_3$, $Li_2CO_3$, and $Nb_2O_5$. $\beta$ can be adjusted by changing the mixing ratio of LiF and $LaF_3$. When firing is performed, a part of the materials is sublimated. Therefore, $\alpha$ and $\beta$ can also be adjusted by changing firing conditions, a firing furnace atmosphere, and a firing furnace size in the first firing process and the second firing process.

Figure 4:
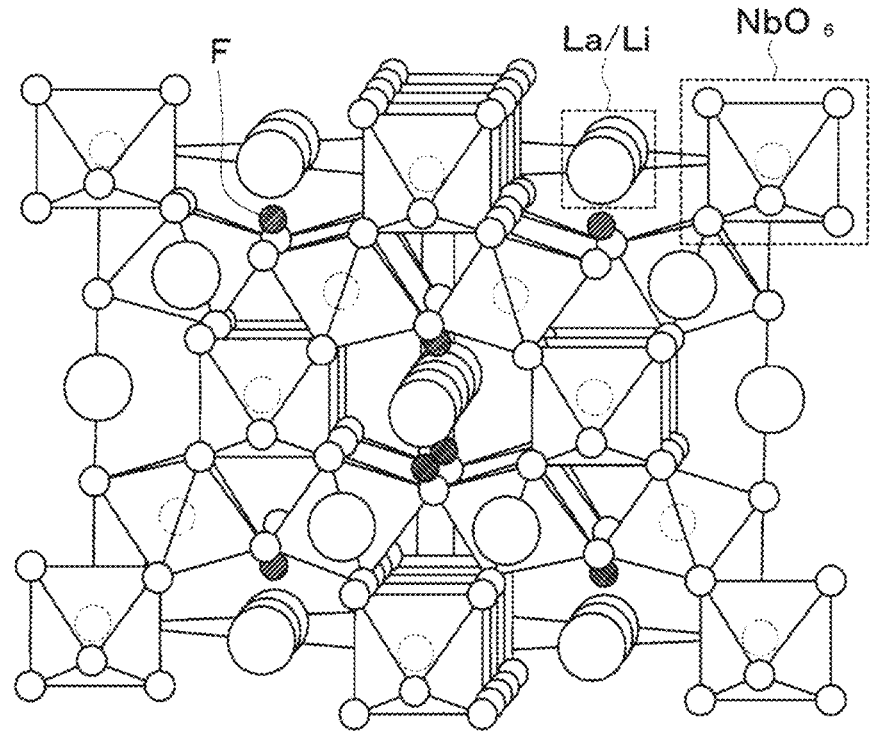
FIG. 4 is a diagram illustrating a crystal structure of the pyrochlore solid electrolyte.

Next, a crystal structure of the pyrochlore solid electrolyte of the present embodiment will be described with reference to FIG. 4. FIG. 4 shows a crystal structure obtained by radiant light analysis of the pyrochlore solid electrolyte of the present embodiment. In the radiated light analysis, the crystal structure was obtained by performing Rietveld analysis using measurement data by X-ray diffraction (XRD).

As shown in FIG. 4, the pyrochlore solid electrolyte has a crystal structure in which an octahedral three-dimensional network composed of $NbO_6$ is formed. In $NbO_6$, O is arranged at each vertex with Nb as the center, and each vertex is shared with the adjacent $NbO_6$. In the three-dimensional network composed of $NbO_6$, a hexagonal tunnel structure in which cations composed of La/Li and anions composed of F are arranged is formed.

Figure 5:
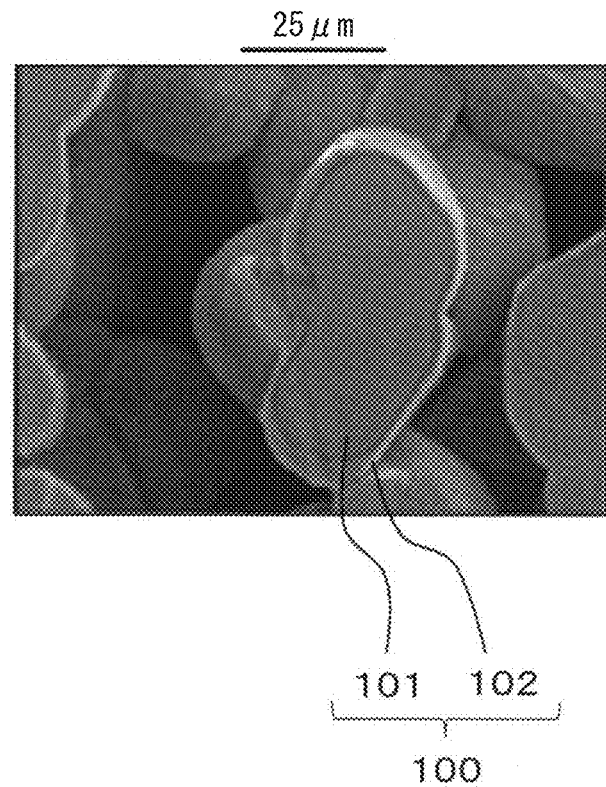
FIG. 5 is a scanning electron microscope (SEM) image of the composite solid electrolyte.

FIG. 5 is a scanning electron microscope (SEM) image of the composite solid electrolyte 100. As shown in FIG. 5, it can be confirmed that the shell phase 102 is formed on the surface of the core phase 101 in the composite solid electrolyte 100 produced in the present embodiment.

The particulate composite solid electrolyte 100 can be used as the electrolyte layer 15, for example, in a state of a green compact or a sintered compact.

As shown in FIG. 6, a green compact of the composite solid electrolyte 100 can be obtained by pressure-forming the particulate composite solid electrolyte 100 at a predetermined pressure (for example, 100 MPa). In the green compact of the composite solid electrolyte 100, the shell phase 102 having a low Young's modulus is crushed by pressurization. Therefore, a relative density of the composite solid electrolyte 100 increases, and a contact area with the adjacent composite solid electrolyte 100 further increases. As a result, an interface resistance of the adjacent composite solid electrolytes 100 can be reduced, and the ion conductivity of the composite solid electrolyte 100 can be improved.

As shown in FIG. 6, a sintered compact of the composite solid electrolyte 100 can be obtained by heating and sintering the green compact of the composite solid electrolyte 100 at a predetermined temperature (for example, 1000° C. for 6 hours). The heating temperature for producing the sintered compact is preferably set to be equal to or higher than a melting point of the constituent material of the shell phase 102 and lower than the melting point of the constituent material of the core phase 101.

When the sintered compact of the composite solid electrolyte 100 is heated to a temperature equal to or higher than the melting point of the shell phase 102, the shell phase 102 is melted and is integrated with the shell phase 102 of the adjacent composite solid electrolyte 100. Therefore, the relative density of the composite solid electrolyte 100 increases, and the contact area with the adjacent composite solid electrolyte 100 further increases. As a result, the interface resistance of the adjacent composite solid electrolytes 100 can be reduced, and the ion conductivity of the composite solid electrolyte 100 can be improved. The sintered compact of the composite solid electrolyte 100 has a higher relative density and a larger contact area than the green compact of the composite solid electrolyte 100, and thus the ion conductivity of the electrolyte layer 15 can be further improved.

Here, the ion conductivity and the like of the composite solid electrolyte 100 of the present embodiment will be described using Examples and Comparative Examples. As shown in FIG. 7, the solid electrolytes of Examples 1 to 7 are composite solid electrolytes 100 each having the core phase 101 and the shell phase 102. The constituent material of the core phase 101 is a pyrochlore solid electrolyte, and the constituent material of the shell phase 102 is a compound composed of a part of the constituent elements of the pyrochlore solid electrolyte. Each of solid electrolytes of Comparative Examples 1 and 2 has only a core phase composed of a pyrochlore solid electrolyte, and does not have a shell phase.

First, in each of Examples 1 to 7 and Comparative Examples 1 and 2, the constituent material of the core phase 101 was analyzed by X-ray diffraction (XRD). Each of the core phases 101 of Examples 1 to 6 and Comparative Example 1 was $Li_{1.25}La_{0.58}Nb_2O_6F$. Each of the core phases 101 of each of Example 7 and Comparative Example 2 was $Li_{1.25}La_{0.5}Ta_2O_6F$.

Next, in each of Examples 1 to 7, the constituent material and thickness of the shell phase 102 were analyzed by energy dispersive X-ray spectroscopy (SEM-EDX) and X-ray photoelectron spectroscopy (XPS).

Each of the shell phases 102 of Examples 1 to 3 and 7 consists of one phase, each of the shell phases 102 of Examples 4 and 5 consists of two phases, and the shell phase 102 of Example 6 consists of three phases. In a configuration where the shell phase 102 has a plurality of phases, a first phase is formed on a side closer to the core phase 101, and a second phase and a third phase are formed in a layered manner in this order toward a side apart from the core phase 101.

Each of the composite solid electrolytes 100 of Examples 1 to 3 and 7 has only a first phase composed of LiF as the shell phase 102. The composite solid electrolyte 100 of Example 4 has a first phase made of LiF and a second phase made of $LiNbO_3$ as the shell phase 102. The composite solid electrolyte 100 of Example 5 has a first phase made of LiF and a second phase made of $LiNb_6O_{15}F$ as the shell phase 102. The composite solid electrolyte 100 of Example 6 has a first phase made of LiF, a second phase made of $LiNb_6O_{15}F$, and a third phase made of $LiNbO_3$ as the shell phase 102.

The thickness of the shell phase 102 was 0.1 μm in Example 1, 0.4 μm in Example 2, 2.0 μm in Example 3, 0.4 μm in Example 4, 1.0 μm in Example 5, 2.0 μm in Example 6, and 0.1 μm in Example 7.

Next, the relative densities of the solid electrolytes of Examples 1 to 7 and Comparative Examples 1 and 2 were calculated from the pellet size and the weight.

The relative density of the solid electrolyte was 88% in Example 1, 92% in Example 2, 93% in Example 3, 85% in Example 4, 87% in Example 5, 87% in Example 6, 85% in Example 7, 68% in Comparative Example 1, and 65% in Comparative Example 2. That is, the relative densities of Examples 1 to 7 were 85 to 93%, whereas the relative densities of Comparative Examples 1 and 2 were 65 to 68%. As described above, in Examples 1 to 7 in which the shell phase was formed, higher relative densities were obtained than in Comparative Examples 1 and 2 in which the shell phase was not formed.

Next, the ion conductivities of the solid electrolytes of Examples 1 to 7 and Comparative Examples 1 and 2 were measured by an alternative current (AC) impedance method. In the impedance measurement, an AC signal was applied to each solid electrolyte at a plurality of frequencies, and an AC impedance was measured at each frequency. By plotting the measured impedances on a complex plane, a complex impedance plot including an arc trajectory was obtained. Then, a resistance value of the measurement sample was acquired from a contact point between an extension line of the plurality of measurement points at which the impedance decreased in an arc shape and a horizontal axis, and the ion conductivity was calculated by multiplying the inverse of the resistance value by the thickness (cm)/electrode area (cm²) of the measurement sample.

The ion conductivity was $5.0 \times 10^{-3}$ S/cm in Example 1, $8.0 \times 10^{-3}$ S/cm in Example 2, $6.0 \times 10^{-3}$ S/cm in Example 3, $4.2 \times 10^{-3}$ S/cm in Example 4, $6.3 \times 10^{-3}$ S/cm in Example 5, $6.0 \times 10^{-3}$ S/cm in Example 6, $1.3 \times 10^{-3}$ S/cm in Example 7, $2.3 \times 10^{-4}$ S/cm in Comparative Example 1, and $5.0 \times 10^{-5}$ S/cm in Comparative Example 2.

The solid electrolytes of Examples 1 to 7 had ion conductivities of the order of $10^{-3}$ S/cm, the solid electrolyte of Comparative Example 1 had an ion conductivity of the order of $10^{-4}$ S/cm, and the solid electrolyte of Comparative Example 2 had an ion conductivity of the order of $10^{-5}$ S/cm. As described above, the solid electrolytes of Examples 1 to 7 were different from the solid electrolytes of Comparative Examples 1 and 2 in the number of digits of the ion conductivity, and remarkably high ion conductivities were obtained.

In the secondary battery 10 of the present embodiment described above, the composite solid electrolyte 100 having the core phase 101 and the shell phase 102 is used as the electrolyte material of the electrolyte layer 15. Accordingly, the relative density and the contact area of the composite solid electrolyte 100 can be improved, and as a result, the ion conductivity of the composite solid electrolyte 100 can be improved.

Second Embodiment

The following describes a second embodiment of the present disclosure. Hereinafter, only portions different from the first embodiment are described.

In the secondary battery 10 of the second embodiment, the composite solid electrolyte 100 is also included in the positive electrode 14 in addition to the electrolyte layer 15. The positive electrode 14 contains the composite solid electrolyte 100 used in the electrolyte layer 15 in addition to the positive electrode active material. The positive electrode active material and the composite solid electrolyte 100 are used in a mixed state. Therefore, in the positive electrode 14, the positive electrode active material and the composite solid electrolyte 100 are in direct contact with each other. The composite solid electrolyte 100 having a particle shape can be used, for example, in the form of a green compact or a sintered compact.

As shown in FIG. 8, when particles of a positive electrode active material 200 and particles of the composite solid electrolyte 100 are pressure-formed at a predetermined pressure (for example, 100 MPa), a green compact of the positive electrode active material 200 and the composite solid electrolyte 100 can be obtained. In the green compact of the positive electrode active material 200 and the composite solid electrolyte 100, the shell phase 102 of the composite solid electrolyte 100 is crushed by pressurization. Therefore, the relative density of the positive electrode active material 200 and the composite solid electrolyte 100 increases, and the contact area increases. As a result, the interface resistance between the positive electrode active material 200 and the composite solid electrolyte 100 can be reduced, and the ion conductivity can be improved.

As shown in FIG. 8, when the green compact of the positive electrode active material 200 and the composite solid electrolyte 100 are heated and sintered at a predetermined temperature (for example, 850° C. for 6 hours), a sintered compact of the positive electrode active material 200 and the composite solid electrolyte 100 can be obtained. The heating temperature for producing the sintered compact is preferably set to be equal to or higher than the melting point of the constituent material of the shell phase 102 and lower than the melting point of the constituent material of the core phase 101.

In the sintered compact of the positive electrode active material 200 and the composite solid electrolyte 100, the shell phases 102 are melted and integrated.

Therefore, the relative density of the positive electrode active material 200 and the composite solid electrolyte 100 increases, and the contact area increases. As a result, the interface resistance between the positive electrode active material 200 and the composite solid electrolyte 100 can be reduced, and the ion conductivity can be improved.

In the second embodiment, the ion conductivity of the positive electrode 14 can be improved by adding the composite solid electrolyte 100 having lithium ion conductivity to the positive electrode 14.

In the configuration of the second embodiment, the shell phase 102 of the composite solid electrolyte 100 functions as an element diffusion barrier layer. Therefore, when heating is performed in a state where the composite solid electrolyte 100 and the positive electrode active material are in direct contact with each other, it is possible to restrict diffusion of elements contained in the core phase 101 into the positive electrode active material and restrict diffusion of elements contained in the positive electrode active material into the core phase 101.

Here, byproducts in a case where the composite solid electrolyte 100 of the second embodiment and the positive electrode active material are used in a mixed state will be described using Examples and Comparative Examples. As shown in FIG. 9, each of solid electrolytes of Examples 8 and 9 is a composite solid electrolyte 100 having the core phase 101 and the shell phase 102, which is the same solid electrolyte as that of Example 4 of the first embodiment. Each of solid electrolytes of Comparative Examples 3 and 4 has only a core phase composed of a pyrochlore solid electrolyte, and does not have a shell phase.

Each of the core phases 101 of Examples 8 and 9 and Comparative Example 1 was $Li_{1.25}La_{0.58}Nb_2O_6F$. The core phase 101 of Comparative Example 4 was $Li_7La_3Zr_2O_{12}$. Each of the solid electrolytes of Examples 8 and 9 had a first phase composed of LiF and a second phase composed of $LiNbO_3$ as the shell phase 102.

In Example 8 and Comparative Examples 3 and 4, $LiCoO_2$ was used as the positive electrode active material, and in Example 9, $LiNi_{0.33}Mn_{0.33}Co_{0.33}O_2$ was used as the positive electrode active material.

As shown in FIG. 9, in Examples 8 and 9 each using the solid electrolyte having the shell phase 102, no byproduct was generated in the sintered compact of the solid electrolyte and the positive electrode active material. On the other hand, in Comparative Examples 3 and 4 each using the solid electrolyte not having the shell phase 102, a byproduct was generated in the sintered compact of the solid electrolyte and the positive electrode active material. In Comparative Example 3, $Li_{0.5}La_{0.5}CoO_2$ and $Li_{0.5}La_{0.5}Nb_2O_6$ were generated as byproducts, and in Comparative Example 4, $Li_{0.5}La_{0.5}CoO_2$ and $La_2Zr_2O_7$ were generated as byproducts.

It is considered that, when the positive electrode active material and each of the solid electrolytes of Comparative Examples 3 and 4 without the shell phase 102 were mixed and heated, elements contained in the positive electrode active material and elements contained in the solid electrolyte were diffused with each other, and as a result, byproducts were generated. In contrast, it is considered that, in Examples 8 and 9, since the shell phase 102 of the composite solid electrolyte 100 functions as the element diffusion barrier layer, elements contained in the core phase 101 and elements contained in the positive electrode active material can be restricted from diffuse into each other, and the generation of byproducts can be restricted.

Next, in each of Examples 8 and 9 and Comparative Examples 3 and 4, the ion conductivity of the sintered compact of the solid electrolyte and the positive electrode active material was measured. The ion conductivity of Example 8 was $2.0×10^{-4}$ S/cm, and the ion conductivity of Example 9 was $3.0×10^{-5}$ S/cm. The ion conductivity of Comparative Example 3 was $7.0×10^{-8}$ S/cm, and the ion conductivity of Comparative Example 4 was $8.0×10^{-9}$ S/cm.

As described above, in each of Examples 8 and 9 in which no byproduct was generated, significantly higher ion conductivity was obtained than in Comparative Examples 3 and 4 in which the byproducts were generated.

According to the second embodiment described above, when the positive electrode active material 200 and the composite solid electrolyte 100 are mixed and heated, the shell phase 102 of the composite solid electrolyte 100 functions as the element diffusion barrier layer, and the elements contained in the core phase 101 and the elements contained in the positive electrode active material can be restricted from diffusing into each other. Accordingly, when the positive electrode active material and the composite solid electrolyte 100 are mixed and heated, it is possible to restrict the generation of byproducts, and it is possible to restrict a decrease in ion conductivity.

According to the second embodiment, the positive electrode active material 200 and the composite solid electrolyte 100 are subjected to pressure forming, whereby the shell phase 102 of the composite solid electrolyte 100 having a low Young's modulus is crushed. Accordingly, the contact area between the positive electrode active material 200 and the composite solid electrolyte 100 is increased, and the interface resistance can be reduced.

In the composite solid electrolyte 100 of the second embodiment, only an inorganic compound is contained in the shell phase 102. However, in a case where the positive electrode 14 contains an organic binder, the shell phase 102 may contain an organic compound derived from the organic binder in addition to the inorganic compound.

In the configuration of the second embodiment, the mixture of the positive electrode active material 200 and the composite solid electrolyte 100 is produced by pressurization and sintering, but the mixture of the positive electrode active material 200 and the composite solid electrolyte 100 may be produced by a method other than pressurization and sintering. For example, the positive electrode active material 200 and the composite solid electrolyte 100 may be formed into a slurry, the composite solid electrolyte 100 may be electrostatically sprayed on the positive electrode active material 200, or the positive electrode active material 200 and the composite solid electrolyte 100 may be pulverized by a ball mill. In another example, a surface of the positive electrode active material 200 may be coated with the composite solid electrolyte 100 by a physical vapor deposition (PVD) method, a chemical vapor deposition (CVD) method, or an atomic layer deposition (ALD) method. Furthermore, the mixture of the positive electrode active material 200 and the composite solid electrolyte 100 produced by the above method may be pressurized and sintered.

Third Embodiment

The following describes a third embodiment of the present disclosure. Hereinafter, only portions different from the above-described embodiments are described.

As shown in FIG. 10, a secondary battery 10 of the third embodiment includes a separator layer 16. In an example shown in FIG. 10, the separator layer 16 is disposed between the negative electrode 12 and the electrolyte layer 15.

The separator layer 16 may include, for example, an electrolytic solution and a separator. The separator has a pore structure, and has a function of separating the negative electrode 12 and the positive electrode 14 and allowing ions to pass therethrough. As the separator, for example, a porous body can be used. As the electrolytic solution, for example, ethylene carbonate or the like can be used. When the electrolytic solution is used for the separator layer 16, the occurrence of a short circuit can be restricted more than in a case of using a solid electrolyte.

The composite solid electrolyte 100 can be applied to a surface of the separator or a surface of the positive electrode 14. When the composite solid electrolyte 100 is applied to the surface of the separator, the contact area between the separator and the composite solid electrolyte 100 can be increased, and the interface resistance between the separator and the composite solid electrolyte 100 can be reduced. When the composite solid electrolyte 100 is applied to the surface of the positive electrode 14, the contact area between the positive electrode 14 and the composite solid electrolyte 100 can be increased, and the interface resistance between the positive electrode 14 and the composite solid electrolyte 100 can be reduced.

When at least one of Nb, V, Sb, and Bi is used as the B cation, the pyrochlore solid electrolyte included in the composite solid electrolyte 100 has a property of reducing lithium ion conductivity due to contact with lithium metal and increasing resistance to be insulated. Therefore, by disposing the composite solid electrolyte 100 on a side close to the positive electrode 14, it is possible to restrict a decrease in ion conductivity due to direct contact of lithium metal with the pyrochlore solid electrolyte.

In the third embodiment, the separator layer 16 may be formed of a solid electrolyte or a polymer. In this case, a contact area between the solid electrolyte or polymer constituting the separator layer 16 and the composite solid electrolyte 100 can be increased, and an interface resistance can be reduced.

Other Embodiments

The present disclosure is not limited to the embodiments described above, and various modifications can be made as follows within a range not departing from the spirit of the present disclosure. The means disclosed in each of the above embodiments may be appropriately combined to the extent practicable.

For example, in the above embodiments, the solid electrolyte for the secondary battery of the present disclosure is applied to the lithium ion battery, but the solid electrolyte for the secondary battery of the present disclosure may be applied to another secondary battery. Specifically, when K is used as the alkali metal represented by Aa in the composition formula, it can be used as a solid electrolyte for a potassium ion battery, and when Na is used as the alkali metal represented by Aa in the composition formula, it can be used as a solid electrolyte for a sodium ion battery.

What is claimed is:

1. A solid electrolyte for a secondary battery, comprising:
a core phase having a particle shape; and
a shell phase covering at least a part of the core phase, wherein
the shell phase consists of one or more phases,
a constituent material of the core phase includes a pyrochlore solid electrolyte represented by a composition formula of $Aa_{2-\alpha}Ab_{(1+\alpha)/3}B_2O_{7-\beta}X_\beta$, where Aa is an alkali metal, Ab is a lanthanoid, B is a cationic metal, and X is an anion that is substitutable with O,
a constituent material of the shell phase includes a material having a chemical composition including Li and different from a chemical composition of the pyrochlore solid electrolyte, and having a melting point lower than a melting point of the pyrochlore solid electrolyte,
in the composition formula, $\alpha$ is in a range of $0.6<\alpha<2.0$, $\beta$ is in a range of $0<\beta\leq1$, and a sum of valences of cations composed of Aa, Ab and B and anions composed of O and X is negative, and
the pyrochlore solid electrolyte has a defective structure.

2. The solid electrolyte according to claim 1, wherein the constituent material of the shell phase includes LiF.

3. The solid electrolyte according to claim 1, wherein the solid electrolyte is a sintered compact in which a plurality of particles including the core phase and the shell phase is sintered.

4. A secondary battery comprising:
an electrolyte layer containing a solid electrolyte; and
a positive electrode and a negative electrode sandwiching the electrolyte layer therebetween, wherein
the solid electrolyte includes a core phase having a particle shape and a shell phase covering at least a part of the core phase,
the shell phase includes one or more phases,
a constituent material of the core phase includes a pyrochlore solid electrolyte represented by a composition formula of $Aa_{2-\alpha}Ab_{(1+\alpha)/3}B_2O_{7-\beta}X_\beta$, where Aa is an alkali metal, Ab is a lanthanoid, B is a cationic metal, and X is an anion that is substitutable with O,
a constituent material of the shell phase includes a material having a chemical composition including Li and different from a chemical composition of the pyrochlore solid electrolyte, and having a melting point lower than a melting point of the pyrochlore solid electrolyte,
in the composition formula, $\alpha$ is in a range of $0.6<\alpha<2.0$, $\beta$ is in a range of $0<\beta\leq1$, and a sum of valences of cations composed of Aa, Ab and B and anions composed of O and X is negative, and
the pyrochlore solid electrolyte has a defective structure.

5. The secondary battery according to claim 4, wherein
the positive electrode includes a positive electrode active material, and
the positive electrode active material and the solid electrolyte are disposed to be in direct contact with each other.

6. The secondary battery according to claim 4, further comprising
a separator layer that separates the positive electrode and the negative electrode from each other, and
the solid electrolyte is applied to a surface of the separator layer.

7. The secondary battery according to claim 4, further comprising
a separator layer that separates the positive electrode and the negative electrode from each other, and
the solid electrolyte is applied to a surface of the positive electrode.

* * * * *